US006168375B1

(12) United States Patent
LaRue et al.

(10) Patent No.: US 6,168,375 B1
(45) Date of Patent: Jan. 2, 2001

(54) SPRING-LOADED VANED DIFFUSER

(75) Inventors: Gerald Duane LaRue, Torrance; Jose Antonio Cabrales, II, Mission Viejo, both of CA (US)

(73) Assignee: AlliedSignal Inc., Morristown, NJ (US)

( * ) Notice: Under 35 U.S.C. 154(b), the term of this patent shall be extended for 0 days.

(21) Appl. No.: 09/404,384

(22) Filed: Sep. 23, 1999

Related U.S. Application Data

(60) Provisional application No. 60/102,701, filed on Sep. 1, 1998.

(51) Int. Cl.[7] .......... F03D 7/04
(52) U.S. Cl. .......... 415/146; 415/148; 415/211
(58) Field of Search .......... 415/146, 148, 415/149.1, 174.2, 211.2; 417/407

(56) References Cited

U.S. PATENT DOCUMENTS

| | | | |
|---|---|---|---|
| 2,881,972 | 4/1959 | Feilden . | |
| 3,010,697 | 11/1961 | Lazo et al. . | |
| 3,975,911 | 8/1976 | Morgulis et al. . | |
| 4,770,605 * | 9/1988 | Nakatomi | 415/148 |
| 4,844,690 * | 7/1989 | DeLaurier et al. | 415/148 |
| 4,932,207 * | 6/1990 | Harris et al. | 60/39.32 |
| 5,125,228 * | 6/1992 | Jewess et al. | 60/39.36 |

* cited by examiner

*Primary Examiner*—F. Daniel Lopez
*Assistant Examiner*—James M McAleenan
(74) *Attorney, Agent, or Firm*—Felix L. Fischer

(57) ABSTRACT

An annular vane diffuser is disposed within a compressor housing of a turbocharger and employs a wave-type compression spring interposed between the vane diffuser and a backplate to provide a desired pressure loading on the vane diffuser to urge the vanes against the wall of the compressor housing forming one side of the diffuser. The vane diffuser constructed in this manner maintains contact with the compressor housing during turbocharger operation as it moves axially relative to the backplate, thereby providing improved diffuser efficiency.

4 Claims, 1 Drawing Sheet

SPRING-LOADED VANED DIFFUSER

CROSS REFERENCE TO RELATED APPLICATIONS

Figure 1:
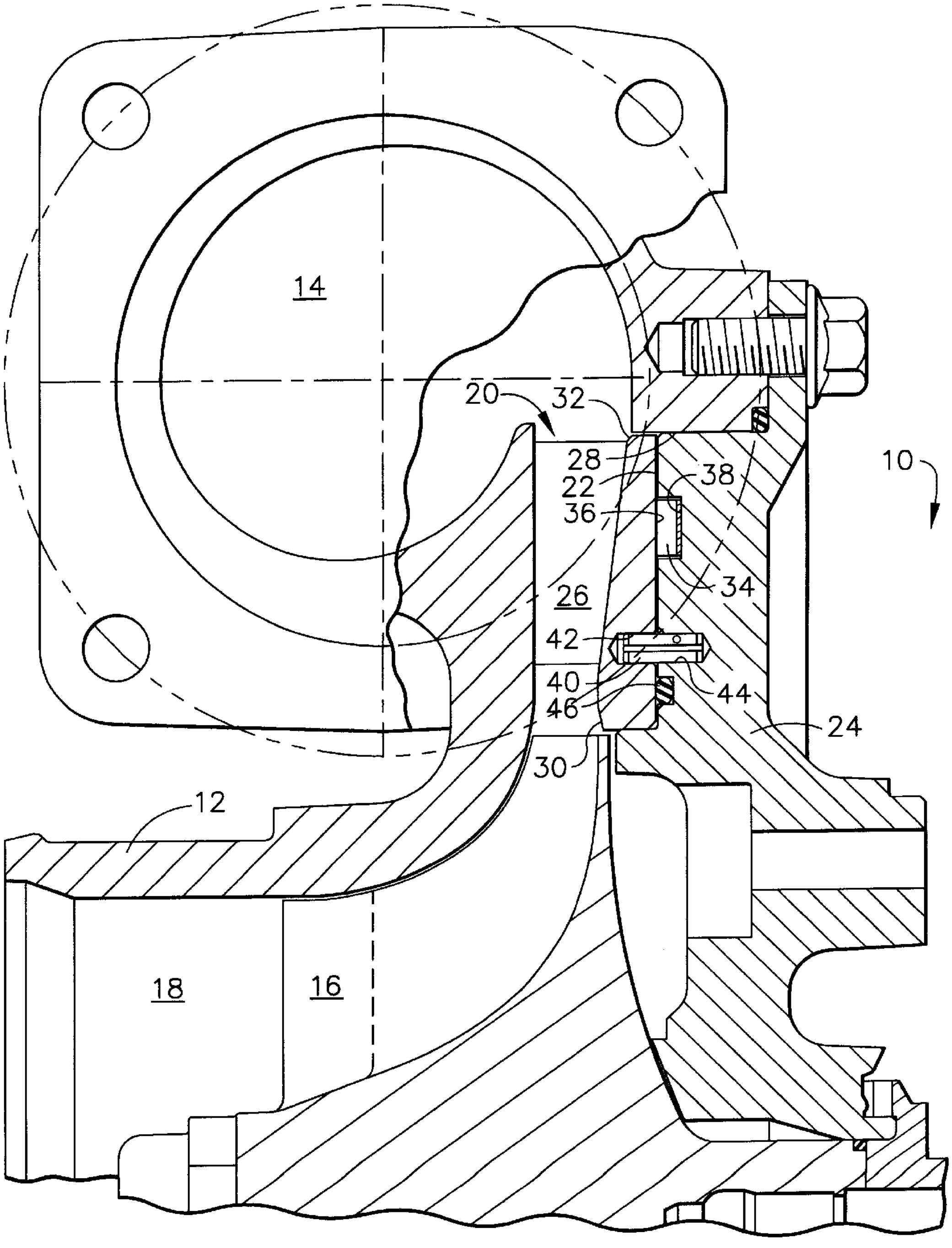

This application claims the priority of copending application Ser. No. 60/102,701 filed on Sep. 1, 1998 having the same title as the present application.

FIELD OF THE INVENTION

This invention relates generally to the field of turbochargers and, more particularly, to a spring-loaded vane diffuser that is positioned within a compressor housing of an exhaust-gas turbocharger.

BACKGROUND OF THE INVENTION

Turbochargers for gasoline and diesel internal combustion engines are known devices used in the art for pressurizing or boosting the intake air stream, routed to a combustion chamber of the engine, by using the heat and volumetric flow of exhaust gas exiting the engine. Specifically, the exhaust gas exiting the engine is routed into a turbine housing of a turbocharger in a manner that causes an exhaust gas-driven turbine to spin within the housing. The exhaust gas-driven turbine is mounted onto one end of a shaft that is common to a radial air compressor impeller mounted onto an opposite end of the shaft. Thus, rotation of the turbine also causes the air compressor impeller to spin within a compressor housing of the turbocharger that is separate from the exhaust housing. The spinning of the air compressor impeller causes intake air to enter the compressor housing and be pressurized or boosted a desired amount before it is mixed with fuel and combusted within the engine combustion chamber.

The compressor housing includes a diffuser that can either be part of the compressor housing or be a separate component attached within the compressor housing. The diffuser acts like a nozzle in reverse within the compressor housing to slow down the air passing therethrough without creating turbulence. The process of slowing down the air flow within the compressor housing converts velocity energy to pressure energy and produced air boost pressure in the turbocharger. The diffuser can include one or more vanes that project outwardly from a diffuser surface and that extend in a generally radial direction in line with the direction of air flow from the compressor impeller. Vanes are used with the diffuser to force the air leaving the compressor impeller to flow in a particular direction, reducing air flow velocity in a way that favors a particular application demand, e.g., a particular engine speed or torque requirement.

Vane diffusers known in the art include those constructed as a separate component of the compressor housing, and that are shaped in the form of an annular ring designed to fit against a backplate axial wall surface. At least one pin is placed axially between the vane diffuser and the backplate to prevent the vane diffuser from rotating within the compressor housing. An elastomeric O-ring energizer is interposed between the vane diffuser and the backplate to both provide an air leakage seal and to pressure load the vane diffuser away from the backplate. Such pressure loading is desired to urge the vane diffuser away from the backplate because the compressor housing is known to move axially away from the backplate under turbocharger operating temperatures and pressures. Thus, such pressure loading is intended to keep the vane diffuser in contact with the housing during such axial movement to prevent compressor performance losses due to air flow restrictions between the compressor housing and vane diffuser. A concern with the vane diffuser described above is that the O-ring energizer is unable to provide both the range and consistent degree of pressure loading that is desired. This is so because: (1) the spring force provided by the O-ring energizer decreases rapidly as the vane diffuser is moved away from the backplate (due to the effect of static pressure within the compressor and its migration between the vane diffuser and backplate), thus is effective for only a very limited range of motion; and (2) the available elastomers used for the O-ring energizer are known to degrade and creep at the high compressor operating temperatures, causing the energizer spring rate to decrease over time.

It is, therefore, desirable that a vane diffuser for use within a compressor housing be constructed to provide constant pressure loading during compressor operating temperatures and pressures to ensure that the vane diffuser remains in contact with the compressor housing as the compressor housing moves during compressor operation. It is desired that such vane diffuser also be constructed to reduce or prevent undesirable aerodynamic effects within the compressor housing during the above-mentioned compressor housing movement. It is also desired that such vane diffuser be constructed in such manner to prevent undesired binding effects during compressor operation that could interfere with a desired degree of axial movement to track the compressor housing.

The details and features of the present invention will be more clearly understood with respect to the detailed description and the drawing.

DETAILED DESCRIPTION OF THE INVENTION

A turbocharger, constructed according to principles of this invention, comprises an annular vane diffuser that is disposed within a compressor housing, that employs a wave-type compression spring interposed between the vane diffuser and backplate to provide a desired pressure loading on the vane diffuser. The vane diffuser constructed in this manner maintains contact with the compressor housing during turbocharger operation as it moves axially relative to the backplate, thereby providing improved air pressurizing efficiency in the compressor housing.

Referring to the FIGURE, a cross-sectional partial side elevation of an exhaust-gas turbocharger 10, constructed according to principles of this invention, is illustrated. Referring to a compressor section of the turbocharger, the turbocharger 10 incorporates a compressor housing 12 having a volute 14 formed therein for receiving pressurized air from an air compressor impeller 16 rotatably disposed within the compressor housing 12. Air enters the compressor housing via an air intake 18 and is accelerated by the spinning air compressor impeller 16. It is to be understood that, as with conventional turbocharger constructions, the air compressor impeller is placed into rotary movement by rotation of an exhaust-gas turbine (not shown) that is attached thereto by a common shaft, and that is disposed within a turbine housing (not shown) opposite the compressor.

A vane diffuser 20 is in the shape of an annular ring and is disposed within the compressor housing 12. The vane diffuser 20 is positioned within a diffuser channel that is formed within an axially-facing surface of a compressor housing backplate 24. The backplate 24 is attached to an exterior surface of the compressor housing in conventional fashion. The vane diffuser comprises a plurality of vanes 26 that each project outwardly a distance away from an axially-facing vane diffuser surface. The vanes 26 each extend along the vane diffuser surface in a generally radial direction, following the direction of an air flow path from the compressor impeller 16 to the volute 14. The number, size, shape and placement of the vanes are understood to vary depending on particular turbocharger application or desired air pressure/velocity effect that is desired.

The vane diffuser 20 has a tapered axially-facing surface moving radially from the impeller 16 to the volute 14. In a preferred embodiment, the vane diffuser axially-facing surface tapers axially inwardly toward the backplate moving from the impeller to the volute. The reason for such a tapered design is to form a generally continuous air flow transition surface moving from the impeller 16 to compressor housing end 28 at the entrance of the volute 14, to reduce air flow resistance in the compressor housing. In a preferred embodiment, the vane diffuser 20 also includes a taper on a leading edge 30 of a vaneless section of the vane diffuser to prevent the creation of an undesired air flow resistance as the vane diffuser moves axially relative to the impeller during turbocharger operation, as better described below. In a preferred embodiment, the vane diffuser 20 also includes a taper on a trailing edge 32 of the vanes 26 to provide a correct area change and smooth transition between the vane diffuser and compressor housing end 28, thereby improving air flow efficiency therethrough.

A spring means 34 is interposed between a backside surface 36 of the vane diffuser 20 and a spring channel 38 that is formed within an axially-facing surface of the backplate 24. The spring means is in the form of an annular ring and fits within the spring channel 38 that runs circumferentially along the backplate. In a preferred embodiment, the spring means 34 is in the form of a flat wave spring that is made from a suitable material that is capable of maintaining a desired spring rate for a desired range of motion under the high temperature conditions within the compressor housing. Preferred wave spring materials include metal and metal alloys in stamped or wire form. A particularly preferred wave spring is formed from a high grade metal material in the form of wire to reduce material cost.

Under turbocharger operating conditions it is known that the pressures and temperatures in the compressor housing cause the compressor housing to move axially away from the backplate by several hundredths of an inch. Significant compressor performances losses are known to occur if such movement creates an air flow resistance by a mismatch between the diffuser and compressor housing, e.g., at the compressor housing end 28. During turbocharger operation, static pressure within the compressor housing volute 14 is known to bleed back behind the vane diffuser 20 to urge the vane diffuser axially away from the backplate 24, helping to keep the vanes in contact with the housing. However, under conditions of low static pressure, in the absence of other mechanical aids, the vane diffuser is not axially displaced within the compressor housing to contact the compressor housing end 28, thus causing a performance loss.

The spring means 34 is positioned between the vane diffuser 20 and backplate 24 to impose a pressure load onto the vane diffuser to urge it axially away from the backplate regardless of static pressure conditions within the compressor housing. This is done to keep the vanes of the vane diffuser in contact with the compressor housing 12, at compressor housing end 28, as the compressor housing moves axially away from the backplate under all turbocharger operating conditions. Contrasted to known vane diffuser designs that make use of an elastomeric O-ring energizer to provide a pressure load, the use of a wave spring is superior because: (1) it provides a spring force over a greater range of vane diffuser axial motion than an elastomeric O-ring energizer; and (2) it provides a desired and predictable spring rate that does not decrease or degrade over time at high temperatures when contrasted to that of an elastomeric O-ring energizer.

A pin 40 includes a first end that is placed within a pin slot 42 in the vane diffuser 20, and a second end that is placed within a pin slot 44 in the backplate 24. The pin 40 extends axially between the vane diffuser and the backplate to prevent the vane diffuser from rotating within the compressor housing 12 during turbocharger operation. An annular seal 46 is disposed within a seal groove formed circumstances along the axially-facing backplate surface 24, and is interposed between the vane diffuser and backplate to provide an air-tight seal therebetween. The annular seal 46 can be in the form of an O-ring seal made from a suitable material that is capable of surviving the temperature and pressure environment within the compressor housing to maintain the desired air-tight seal. The formation and maintenance of such air-tight seal is desired to prevent recirculation air flow around a backside surface of the vane diffuser, thereby improving air flow efficiency and compressor performance.

The turbocharger compressor housing, vane diffuser, and backplate, constructed according to principles of this invention, are attached together according to conventional practice and are combined with other parts conventionally associated with turbochargers to provide a turbocharger for internal combustion engines that incorporates an spring loaded vane diffuser. A feature of this invention is that the vane diffuser is constructed to move axially relative to the backplate to maintain contact and provide a smooth air flow transition with the compressor housing regardless of static air pressure within the compressor housing, thereby providing improved compressor performance.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. A turbocharger for internal combustion engines comprising:

a compressor housing having a volute therein;

a backplate attached to an exterior surface of the compressor housing;

an impeller rotatably mounted within the compressor housing;

an annular vane diffuser axially displacable within the compressor housing having a plurality of vanes projecting axially outwardly therefrom, the vane diffuser being placed within a channel disposed in an axially-facing surface of the backplate;

a spring means interposed between the vane diffuser and the backplate for imposing an axially directed pressure load on the vane diffuser to urge the vane diffuser away from the backplate;

an annular seal interposed between the vane diffuser and the backplate to provide an air-tight seal therebetween; and a pin extending between the vane diffuser and the backplate to prevent the vane diffuser from rotating within the compressor housing.

2. The turbocharger as defined in claim wherein the spring means is an annular wave spring formed from a metal material.

3. The turbocharger as defined in claim 1 wherein the vane diffuser has an axially-facing surface that is tapered to form a continuous transition surface between the impeller and the compressor housing.

4. The turbocharger as defined in claim 1 wherein a vane diffuser end adjacent one of the compressor housing is tapered to reduce air flow restriction effects.

* * * * *

UNITED STATES PATENT AND TRADEMARK OFFICE

CERTIFICATE OF CORRECTION

PATENT NO. : 6,168,375 B1
DATED : January 2, 2001
INVENTOR(S) : Gerald D. LaRue and Jose Antonio Cabrales II It is certified that error appears in the above-identified patent and that said Letters Patent is hereby corrected as shown below:

Title page,
Item [60], Related U.S. Application Data,
"[60] Provisional application No.: 60/102,701, filed on Sept. 1, 1998." should be corrected to read -- [60] Provisional application No.: 60/102,701, filed on Oct. 1, 1998 --

Signed and Sealed this

Sixth Day of April, 2004

JON W. DUDAS
*Acting Director of the United States Patent and Trademark Office*